(12) United States Patent
Chuah

(10) Patent No.: US 9,199,658 B2
(45) Date of Patent: Dec. 1, 2015

(54) BABY STROLLER FOLDING MECHANISM

(76) Inventor: Khai Gan Chuah, Austin, TX (US)

(*) Notice: Subject to any disclaimer, the term of this patent is extended or adjusted under 35 U.S.C. 154(b) by 0 days.

(21) Appl. No.: 13/601,318

(22) Filed: Aug. 31, 2012

(65) Prior Publication Data

US 2013/0340205 A1  Dec. 26, 2013

Related U.S. Application Data

(60) Provisional application No. 61/662,930, filed on Jun. 22, 2012.

(51) Int. Cl.
*B62B 7/06* (2006.01)
*B62B 7/08* (2006.01)

(52) U.S. Cl.
CPC . *B62B 7/062* (2013.01); *B62B 7/06* (2013.01); *B62B 7/064* (2013.01); *B62B 7/08* (2013.01); *B62B 2205/18* (2013.01); *B62B 2205/20* (2013.01); *Y10T 16/541* (2015.01); *Y10T 16/54025* (2015.01); *Y10T 16/540257* (2015.01)

(58) Field of Classification Search
CPC ............ B62B 2205/18; B62B 2205/20; B62B 2205/22; B62B 2205/23; B62B 2205/24; B62B 7/06; B62B 7/062; B62B 7/064; B62B 7/08; Y10T 16/54025; Y10T 16/540257; Y10T 16/54048; Y10T 16/5406; Y10T 16/541; Y10T 16/546
See application file for complete search history.

(56) References Cited

U.S. PATENT DOCUMENTS

| | | | | |
|---|---|---|---|---|
| 3,203,272 A * | 8/1965 | Fernberg | ........................ | 74/527 |
| 4,925,329 A * | 5/1990 | Chuang | ......................... | 403/93 |
| 4,928,792 A * | 5/1990 | Krause | ......................... | 182/163 |
| 5,022,118 A * | 6/1991 | Wan-Li | ......................... | 16/327 |
| 5,039,118 A * | 8/1991 | Huang | .................... | 280/47.371 |
| 5,058,239 A * | 10/1991 | Lee | ................................ | 16/324 |
| 5,062,179 A * | 11/1991 | Huang | ......................... | 16/436 |
| 5,069,474 A * | 12/1991 | Tai | ................................ | 280/658 |
| 5,765,958 A * | 6/1998 | Lan | ................................ | 403/97 |
| 5,887,935 A * | 3/1999 | Sack | ............................. | 296/122 |
| 6,330,733 B1 * | 12/2001 | Rauschenberger | ............ | 16/326 |
| 6,629,801 B2 * | 10/2003 | Cheng | ......................... | 403/101 |
| 6,860,504 B2 * | 3/2005 | Suga et al. | .................... | 280/642 |
| 6,886,852 B2 * | 5/2005 | Cheng et al. | .................. | 280/651 |
| 6,910,708 B2 * | 6/2005 | Sack et al. | ..................... | 280/642 |
| 6,991,248 B2 * | 1/2006 | Valdez et al. | ................. | 280/647 |
| 7,296,820 B2 * | 11/2007 | Valdez et al. | ................. | 280/647 |
| 7,396,039 B2 * | 7/2008 | Valdez et al. | ................. | 280/644 |
| 7,401,803 B1 * | 7/2008 | Lai | ............................... | 280/647 |
| 7,617,569 B2 * | 11/2009 | Liao | ............................. | 16/334 |
| 8,104,141 B2 * | 1/2012 | Yamashita | ..................... | 16/239 |
| 8,226,110 B2 * | 7/2012 | Liao | ............................. | 280/642 |
| 8,308,391 B2 * | 11/2012 | Cheng | ........................ | 403/98 |

(Continued)

*Primary Examiner* — Jeffrey O Brien

(57) ABSTRACT

This invention involves a a folding mechanism of a baby stroller comprising: a pair of gear components, each gear component comprising at least one gear having a plurality of teeth along a majority of the outer circumference of the gear and being configured to protrude towards a central plane between the gear components, said gear components configured to couple together and rotate about a common axis of rotation, the first gear component connected to a front wheel support of the stroller; the second gear component connected to a push handle support of the stroller; a gear controller, said gear controller having a plurality of teeth correspondingly configured to constrain the movement of said gear components; and a locking mechanism, wherein said locking mechanism configured to constrain the movement of said gear controller.

10 Claims, 18 Drawing Sheets

(56) References Cited

U.S. PATENT DOCUMENTS

| | | | | |
|---|---|---|---|---|
| 8,408,580 B2* | 4/2013 | Liao | | 280/642 |
| 8,596,669 B2* | 12/2013 | Liao | | 280/647 |
| 8,661,619 B2* | 3/2014 | Lu | | 16/326 |
| 8,672,341 B2* | 3/2014 | Offord | | 280/650 |
| 8,696,015 B2* | 4/2014 | Karremans et al. | | 280/642 |
| 8,894,091 B2* | 11/2014 | Thorne et al. | | 280/650 |
| 2003/0077111 A1* | 4/2003 | Cheng | | 403/101 |
| 2003/0085551 A1* | 5/2003 | Allen et al. | | 280/642 |
| 2003/0160432 A1* | 8/2003 | Sack et al. | | 280/642 |
| 2004/0222616 A1* | 11/2004 | Valdez et al. | | 280/647 |
| 2006/0038382 A1* | 2/2006 | Valdez et al. | | 280/647 |
| 2006/0071451 A1* | 4/2006 | Cheng | | 280/642 |
| 2007/0096438 A1* | 5/2007 | Valdez et al. | | 280/652 |
| 2007/0164538 A1* | 7/2007 | Yeh | | 280/642 |
| 2007/0284855 A1* | 12/2007 | Lin | | 280/651 |
| 2008/0061533 A1* | 3/2008 | Li | | 280/642 |
| 2008/0079240 A1* | 4/2008 | Yeh | | 280/642 |
| 2008/0143081 A1* | 6/2008 | Valdez et al. | | 280/642 |
| 2009/0020984 A1* | 1/2009 | Chen et al. | | 280/650 |
| 2009/0033065 A1* | 2/2009 | Kassai et al. | | 280/647 |
| 2009/0288270 A1* | 11/2009 | Yamashita | | 16/239 |
| 2010/0045002 A1* | 2/2010 | Cheng | | 280/650 |
| 2010/0308562 A1* | 12/2010 | Valdez et al. | | 280/642 |
| 2011/0084467 A1* | 4/2011 | Liao | | 280/642 |
| 2011/0248478 A1* | 10/2011 | Thorne et al. | | 280/650 |
| 2011/0291389 A1* | 12/2011 | Offord | | 280/650 |
| 2012/0187660 A1* | 7/2012 | Liao | | 280/642 |
| 2012/0256397 A1* | 10/2012 | Valdez et al. | | 280/642 |
| 2013/0113185 A1* | 5/2013 | Zehfuss | | 280/647 |
| 2013/0113188 A1* | 5/2013 | Liao | | 280/650 |
| 2013/0147162 A1* | 6/2013 | Hsu | | 280/647 |

* cited by examiner

BABY STROLLER FOLDING MECHANISM

CROSS-REFERENCE TO RELATED APPLICATIONS

This application claims priority to U.S. Provisional Application Ser. No. 61/662,930, filed on Jun. 22, 2012.

BACKGROUND OF INVENTION

1. Field of Invention

The present invention relates to a method of folding mechanism on a baby stroller to conveniently collapse a baby stroller and more particularly directed to baby strollers that fold with a single hand operation.

2. Discussion of Related Art

In recent years, several inventions have been developed in an attempt to produce an easy method of collapsing the stroller. One particular prior art worth mentioning is a collapsible baby stroller by Sutherland et al. (U.S. Pat. No. 6,102,431) involving a folding mechanism that uses a two knife blade followers to engage a spring loaded piston in an unfolded position. With this present invention, followers are not necessary, thus, reducing extra parts to be made. This will reduce manufacturing cost and time. Mechanism such as stoppers—gear locking slots, protrusion tab—latch and plug—hole positioned in strategic places described in first, second and third embodiments provide a strong locking mechanism to maximize the rigidity of the entire frame structure.

In the fourth, fifth and sixth embodiments, the gears are placed in face-to-face juxtaposition. In comparison with the collapsible baby stroller by Chih-Ching Cheng (U.S. Pat. No. 7,632,035 B2), the embodiments of this present invention provide a solution for better fixation of the pinion gears on the folding mechanism by eliminating the need of using rotatable members with apertures. This reduces not only manufacturing cost and time, but it also increases the durability of the gear component as one solid component, without having apertures on its surface. In addition, two of the embodiments of the present invention eliminate the need of installing the spring locking mechanism on the rear wheel support bar.

SUMMARY OF THE INVENTION

The present invention is a series of methods of folding a baby stroller, which improve the ease of folding a baby stroller and lessens the bulkiness of the stroller for storage. Embodiments of the folding mechanism involve two gears moving simultaneously in the opposite direction to guide the movement of the folding mechanism. The two gears are further connected to the two main pasts of the stroller—the front wheel(s) and the handle bar(s), by means of extensions. One gear is connected to the extension to the front wheel(s), the other is connected to the extension to the handle bar. The embodiments further include a locking mechanism to halt the movement of the two gears indefinitely until the locking mechanism is disengaged. The locking mechanism, in a few embodiments, is further connected to the extension of the rear wheels. In other embodiments, the locking mechanism is an independent mechanism.

DETAILED DESCRIPTION OF THE INVENTION

Figure 1:
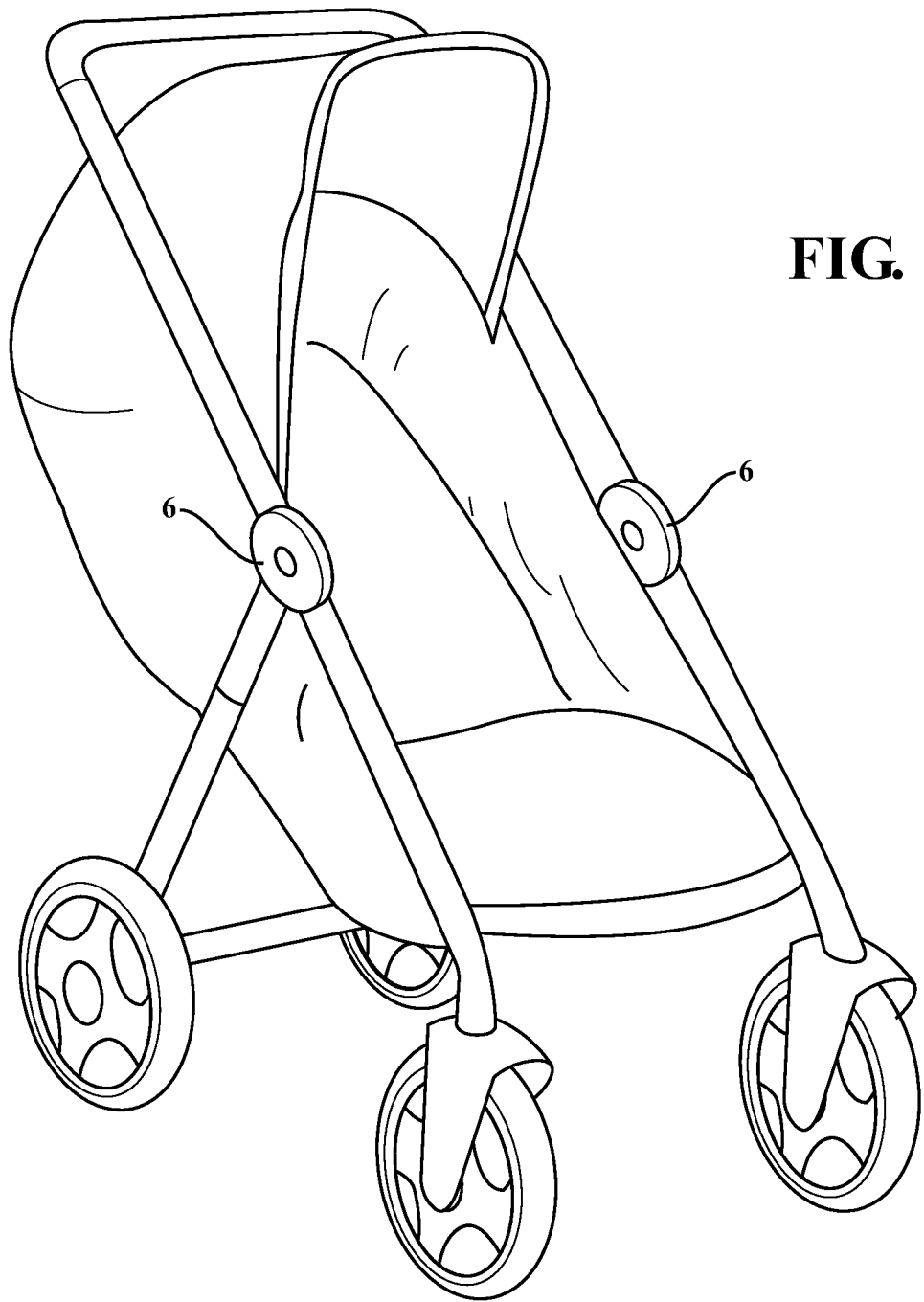
FIG. 1 is an isometric view of an exemplary implementation of a baby stroller embodying the present invention shown in an unfolded state.
Figure 2:
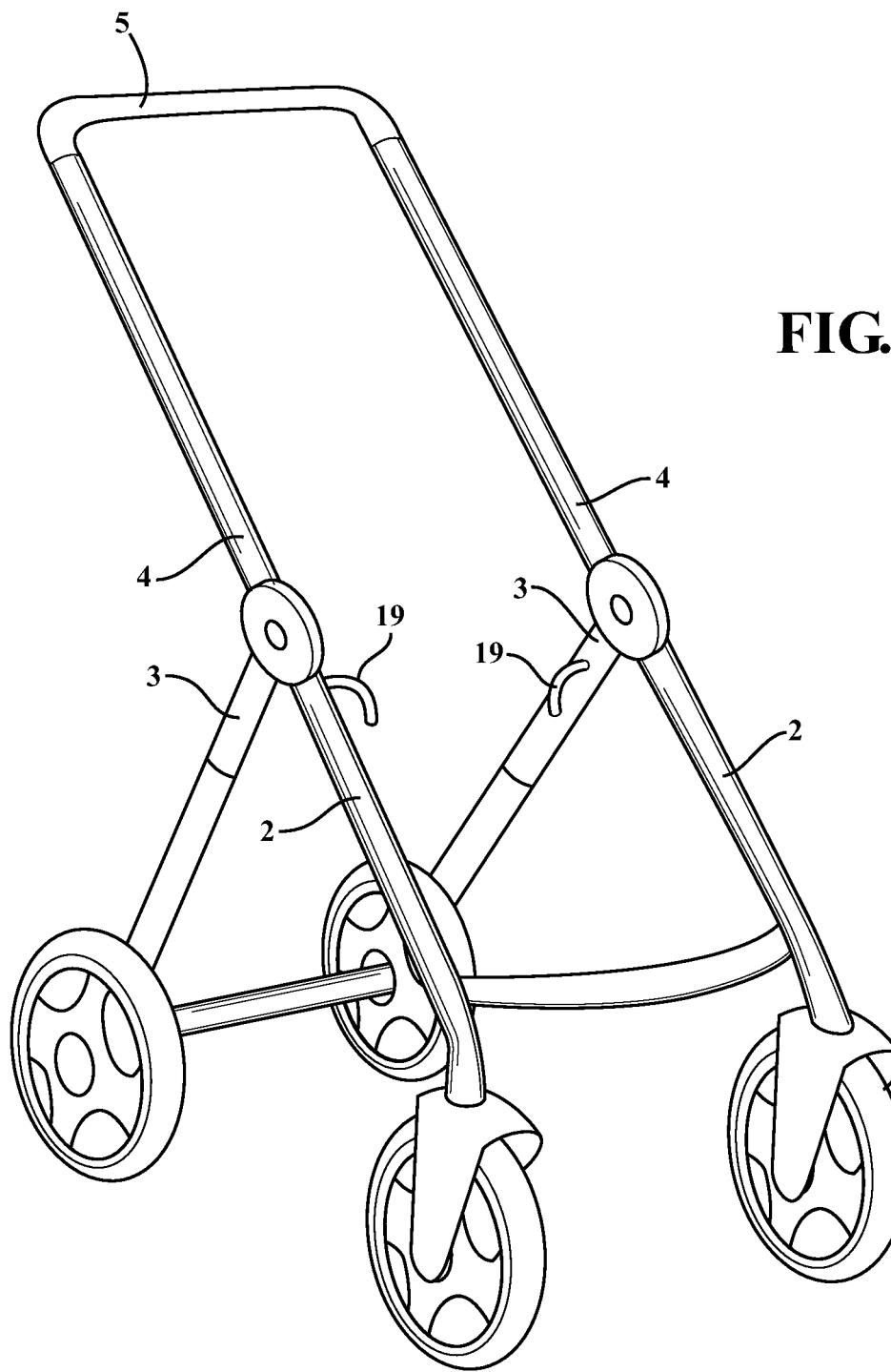
FIG. 2 is an isometric view of the stroller frame of FIG. 1.

The stroller frame is made up of three sections: front wheel support 2, push handle support 4, rear wheel support 3 (See FIG. 2). The left and right front wheels are mounted to the end of the front wheel supports 2. The stroller push handle 5 is mounted to the left and right of the push handle support 4, and the left and right of the rear wheels are mounted to the end of the rear wheel supports 3. These sections are hinged by a folding mechanism 6 (See FIG. 1) placed on both sides of the stroller. The stroller, in the unfolded position depicted in FIG. 3, has the front wheel support 2 and push handle support 4 aligned in a straight line. Conversely, the stroller, in the folded position, is depicted in FIG. 4.

Figure 5:
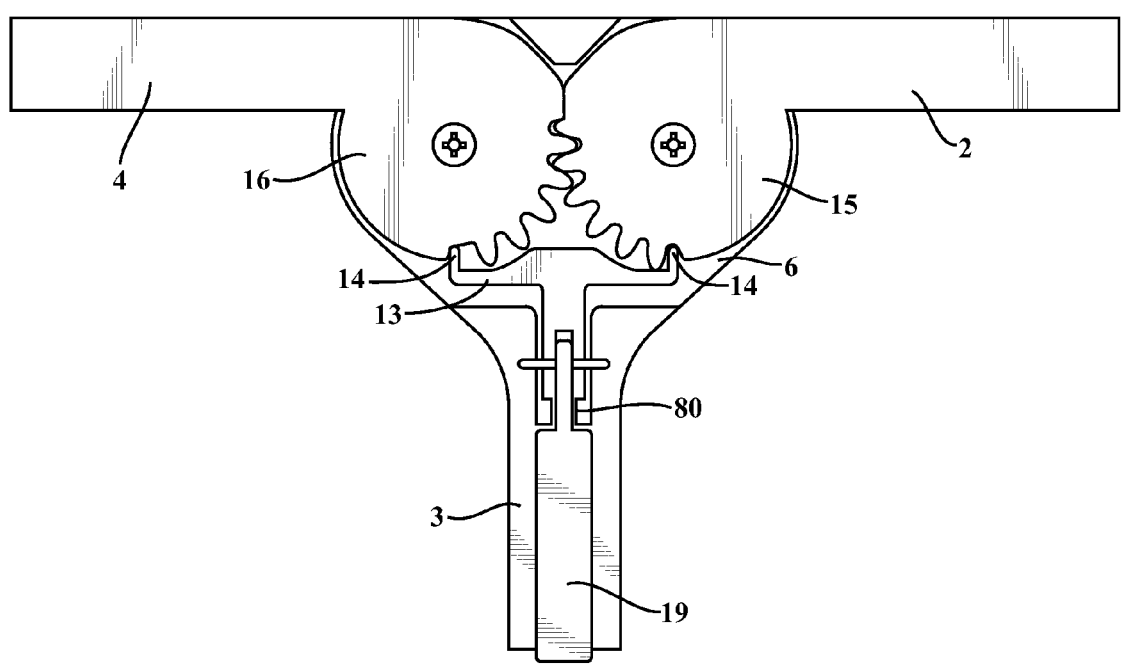
FIG. 5 is an enlarged fragmentary view of the folding mechanism according to an embodiment of the present invention with its outer housing removed and in a fully unfolded state.
Figure 6:
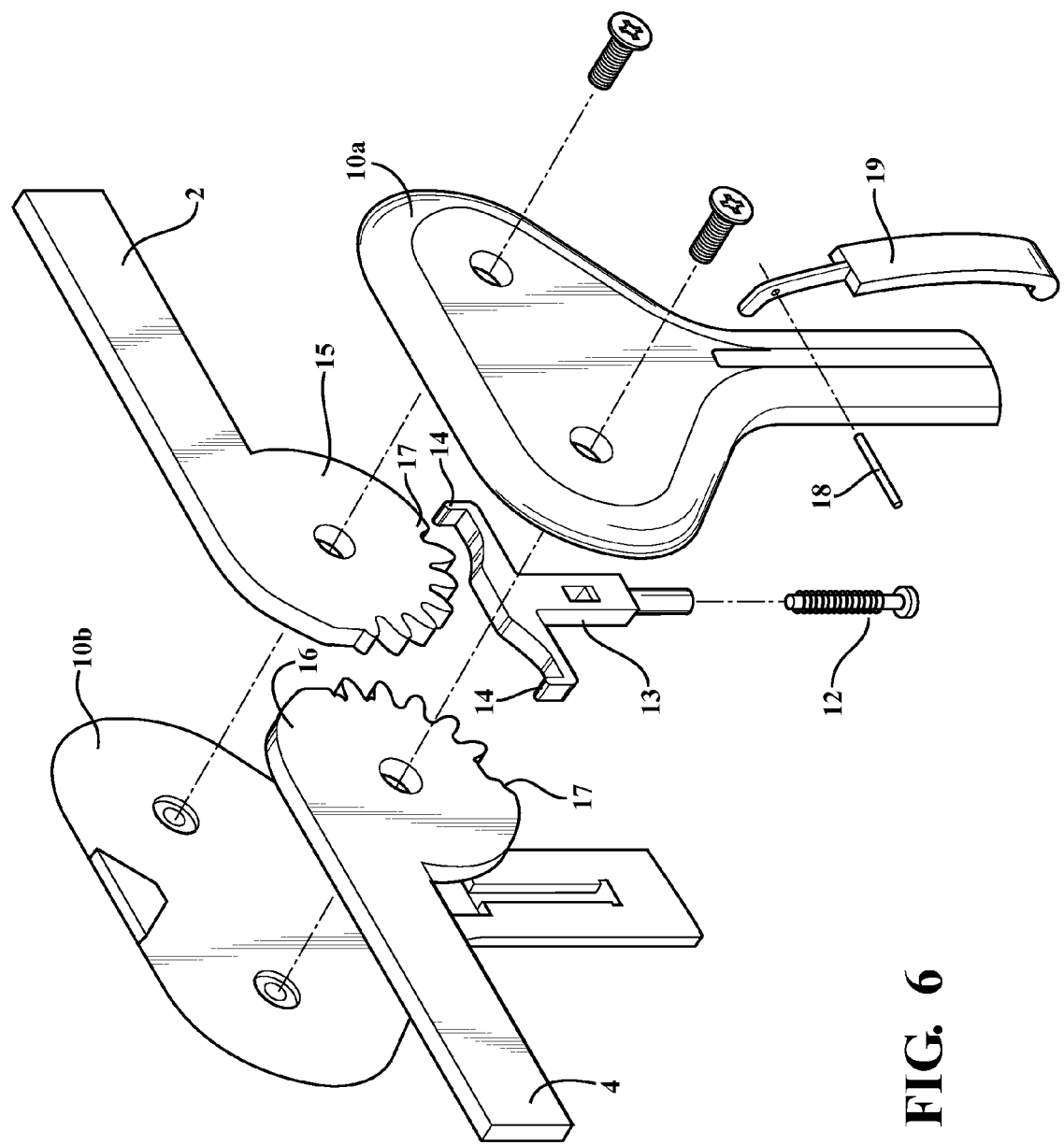
FIG. 6 is an exploded view corresponding to FIG. 5 of the folding mechanism.

The folding mechanism 6 consists of two outer casings 10a, 10b, two gear components 15, 16 and a locking mechanism 80 (See FIG. 5 and FIG. 6), The gear components each consists of a mesh gear with a bar that extends to become the front wheel support 2 or the push handle support 4. The gear components can be made as an entire piece to include all its parts, or be made separately. Both gear components 15, 16 are mounted on pivots of the folding mechanism 6. The gears constrain the movement between the front wheel support 2 and push handle support 4, so either one rotates toward the rear wheel support 3, or the other one will rotate towards rear wheel support 3, as well. The mesh gear is partially toothed or can be of any type of gear, as long as it achieves the same result as above. At the end of the sequence of gear teeth is a gear locking slot 17. The gear locking slot 17 is slightly different from the tooth spaces, as its main function is to provide a fit for the stopper 14 from the locking mechanism 80.

The locking mechanism 80 consists of a spring loaded piston 12 connected to a central bar 13 with stoppers 14 at the ends of the bar. The stoppers 14 can be made of lug, bar, or taband are positioned with means to constrain the movements of both gear components 15, 16 by insertions into the gear locking slot 17 of each gear component 15, 16. The locking mechanism 80 can also be designed with spring loaded pistons that connect to only one stopper engaging on one gear locking slot 17 on either side of the gear component instead of both sides, since locking one gear component will prevent another gear component to move.

When folding, the stoppers 14 on the locking mechanism 80 are retracted from the gear locking slots 17, thereby freeing both gear components 15, 16 to rotate with the influence of gravity force and hence, the collapsing of the front wheel support 2 and push handle support 4. In this case, depicted in FIG. 2, the push handle 5 of the stroller that is connected to the left and right push handle supports 4 at one end rotates counter-clockwise, while the front wheels that are connected to the left and right front wheel supports 2 at the other end rotates clockwise. Thus, the final result is a folded stroller depicted in FIG. 4.

Figure 3:
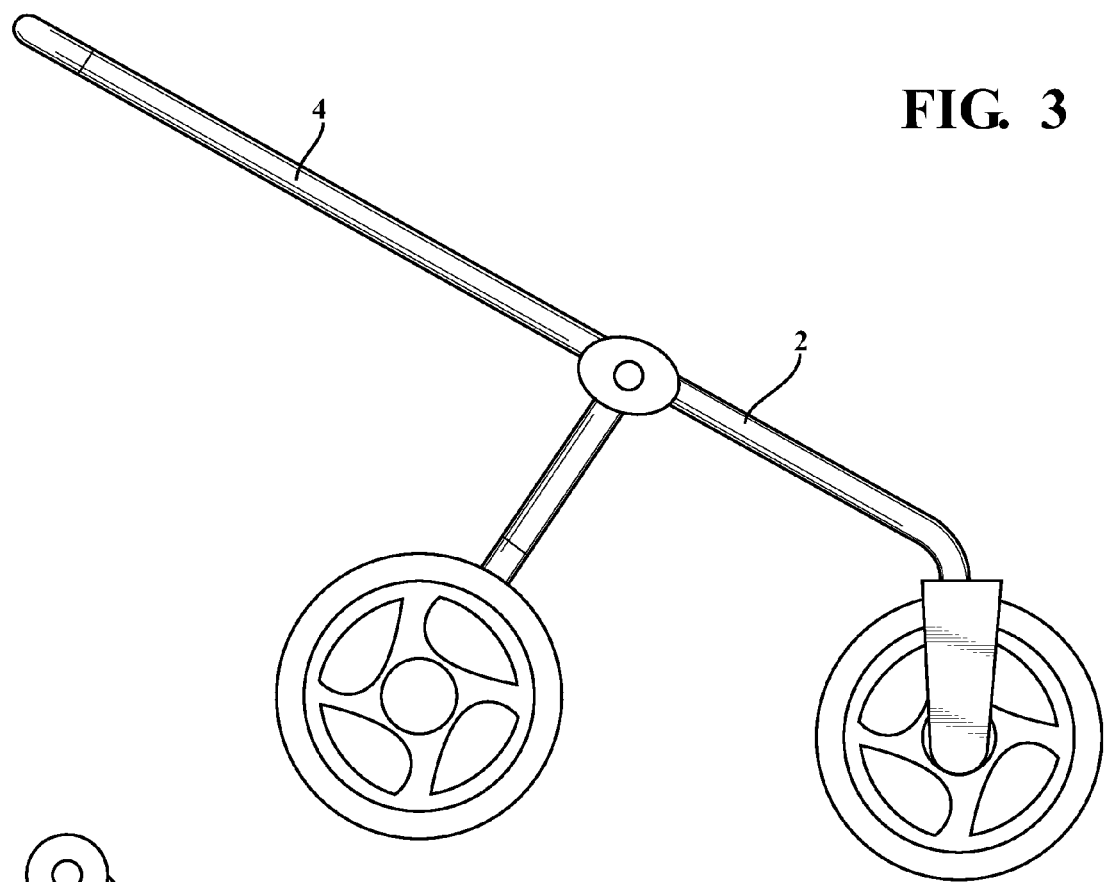
FIG. 3 is a side elevation view of the stroller frame of FIG. 2.
Figure 4:
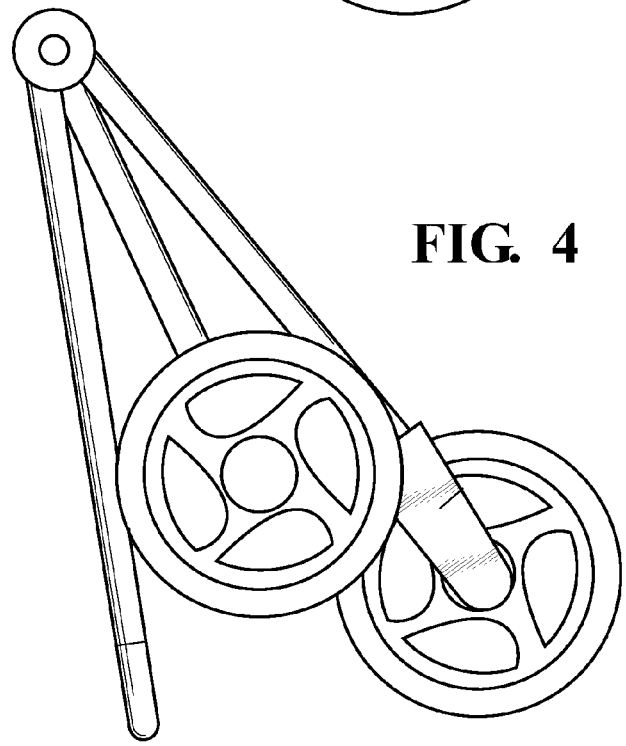
FIG. 4 is a side elevation view of the stroller frame with a folding mechanism shown in a fully folded state.

The stroller, in the unfolded position depicted in FIG. 3, has the front wheel support 2 and push handle support 4 aligned in a straight line. During the unfolding process, each gear component 15, 16 moves upwardly, with a sequence of teeth on the mesh gear rotating in the opposite direction, until the stoppers 14 fall into the gear locking slot 17 with the release of the loaded tension in the locking mechanism 80 (See FIG. 5). The rotation of the gear components is further constrained by lack of gear teeth on the other end of the teeth sequence. The remaining tension from in the locking mechanism 80 maintains the stoppers 14 in contact with the gear locking slots 17, preventing the front wheel support 2 and push handle support 4 from folding.

The retraction of locking mechanism 80 can be achieved by lifting up the pull bar or lever 19. The lever 19 is connected to the locking mechanism via pin 18 (See FIG. 6), The position of the lever can be extended away from the locking mechanism 80 to be in closer proximity to the stroller user by using means such as cable wires on locking mechanism 80 and levers 19 to control the locking operation. The stroller will fold only when both levers 19 on each side of the stroller are lifted up simultaneously. This can be achieved by connecting both levers 19 on each side of the stroller with a handle strap.

Figure 7:
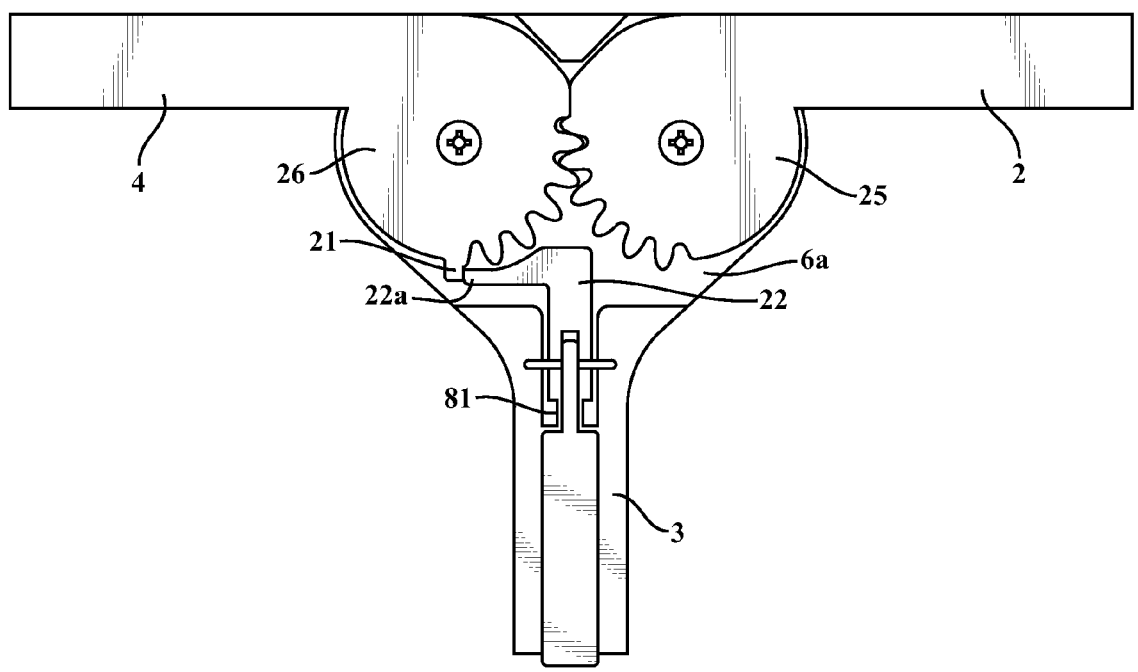
FIG. 7 is an enlarged fragmentary view of the folding mechanism according to the second embodiment of the present invention with its outer housing removed and in a fully unfolded state.
Figure 8:
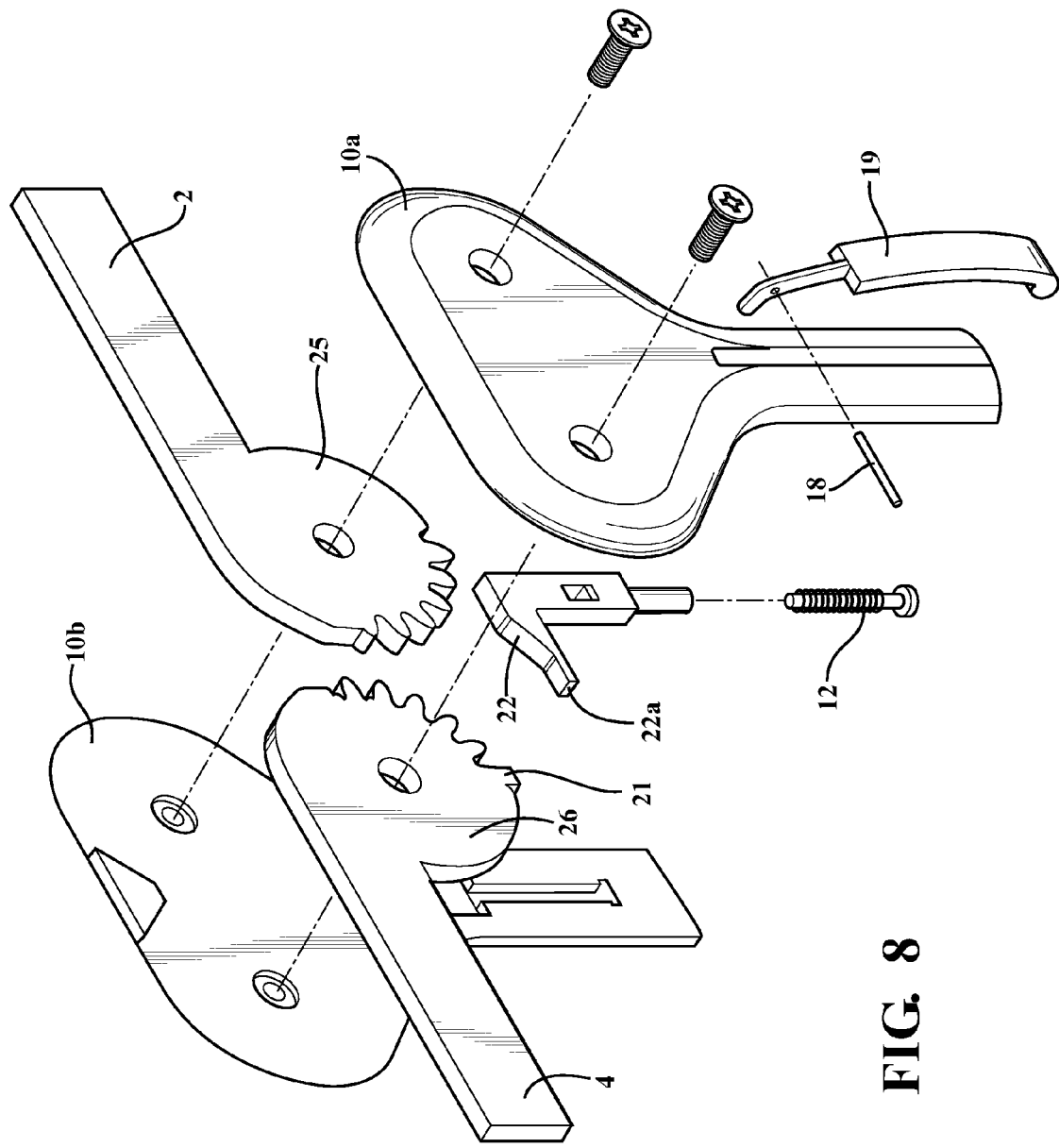
FIG. 8 is an exploded view corresponding to FIG. 7 of the folding mechanism.

Instead of using the stoppers 14 and gear locking slots 17 for means of initialing and halting the movement of the gear components 15, 16, in the folding mechanism 6a, a modification can be made to one of the gear components where a protrusion tab 21 is positioned at the end of the sequence of gear teeth of the gear component 26 (See FIG. 7 and FIG. 8). The protrusion tab 21 acts as a stopper for a latch 22, which is connected to the locking mechanism 81. The locking mechanism 81 consists of a spring loaded piston 12 connected to a latch 22.

When folding, latch 22 is retracted away from the protrusion tab 21, allowing the movement of the gear components 25, 26. The bar of the gear components will move downwardly with influence of gravity force. When unfolding, the gear components 25, 26, rotate in the opposition direction with the gear teeth surface sliding along the surface of latch 22, as tension from the loaded spring keeps a light contact between the gear teeth and the surface. When the protrusion tab 21 passes the tip 22a of latch 22, the tension from the spring loaded piston 12 will cause latch 22 to anchor onto the protrusion tab 21, thereby halting the movement of the gear components 25, 26. The latch 22 and protrusion tab 21 can be of any size and shape, as long as it is able to engage to each other.

Figure 9:
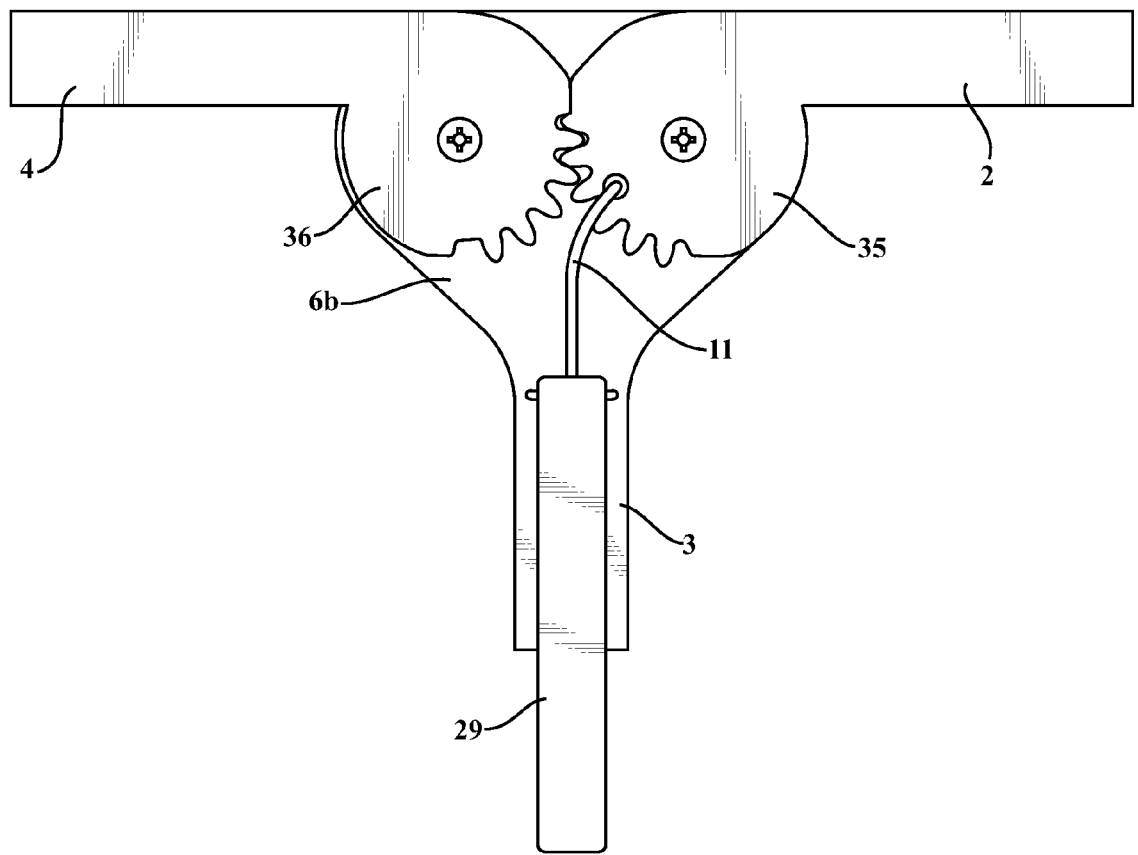
FIG. 9 is an enlarged fragmentary view of the folding mechanism according to the third embodiment of the present invention with its outer housing removed and in a fully unfolded state.
Figure 10:
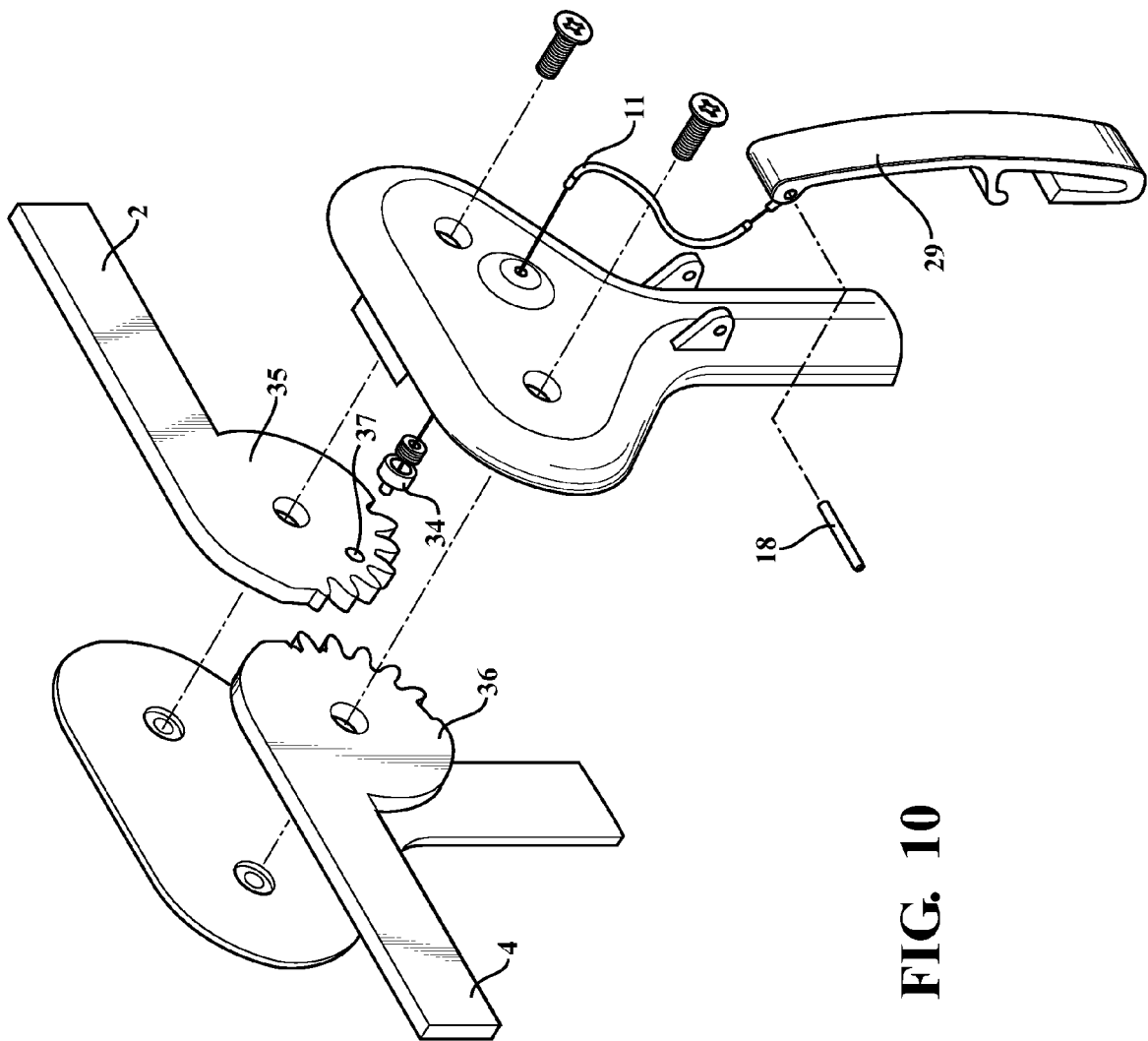
FIG. 10 is an exploded view corresponding to FIG. 9 of the folding mechanism.

In another embodiment, instead of having gear locking slot 17 or protrusion tab 21, a locking hole 37 on the surface of one of the gear components of the folding mechanism 6b and a spring loaded plug 34 are being used (See FIG. 9 and FIG. 10). A lever 29 is attached to the spring loaded plug 34 by cable wire 11 to control the movement of the plug.

When the front wheel support 2 and push handle support 4 are in the process of unfolding, the plug 34 of the locking mechanism 81 slides along the surface of the gear component 35 until it finally meets with the locking hole 37 and engages with the locking hole 37 due to the tension release of the spring, thereby locking the rotator. movement of the gear components 35, 36. To fold, the lever 29 is lifted up to retract the spring of the plug 34, thereby removing the plug 34 from the locking hole 37. Both gear components 35, 36 begin to rotate freely with the influence of gravity force on the from wheel support 2 and push handle support 4 to fold the stroller. One of the benefits of this embodiment is that the locking mechanism 81 is no longer attached to the rear wheel support 3. In this design, the locking mechanism 81 can be placed on a lateral side, or any position of the folding mechanism 6b instead of on rear wheel support 3.

Figure 11:
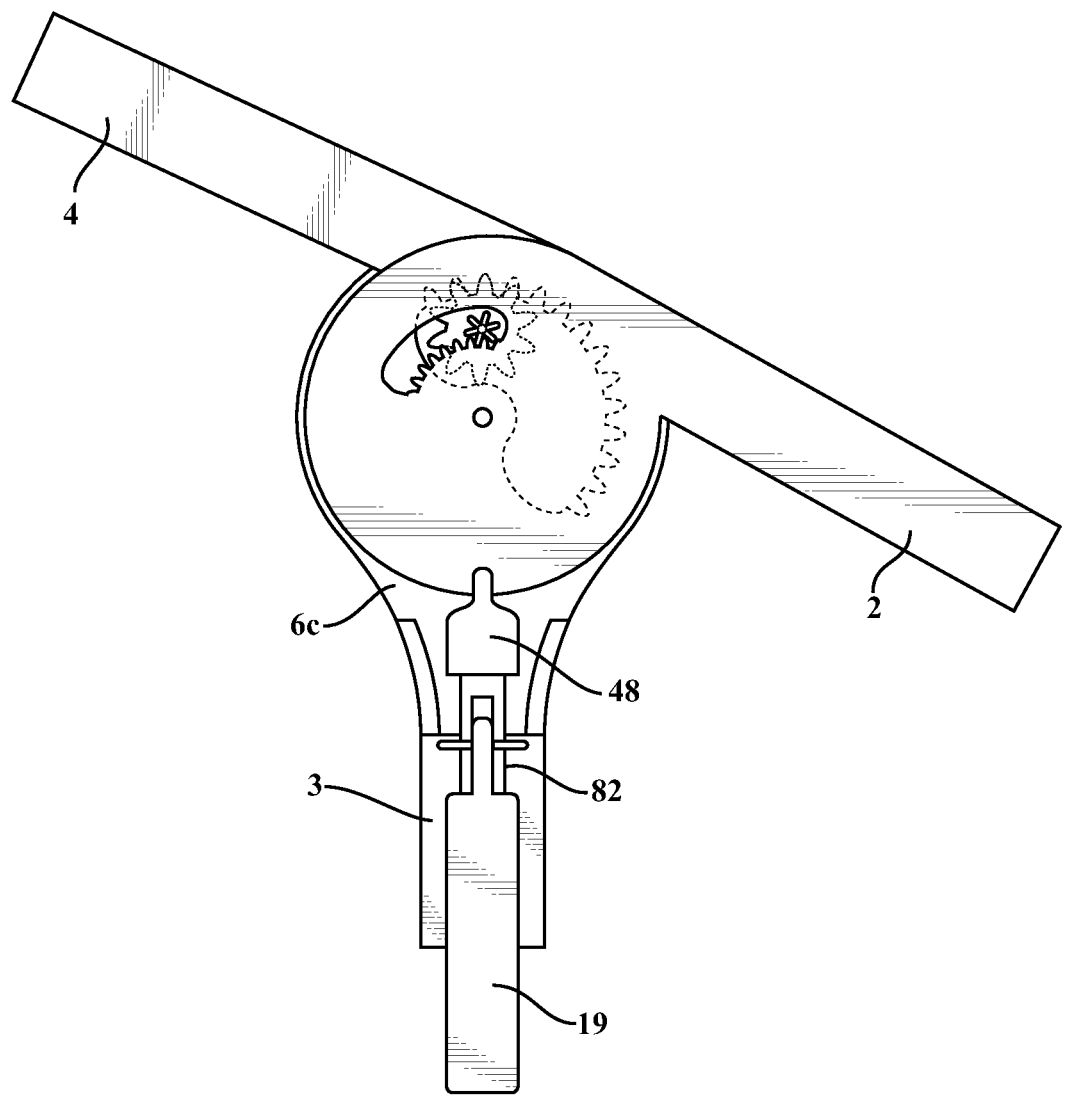
FIG. 11 is an enlarged fragmentary view of the folding mechanism according to the fourth embodiment of the present invention with its outer housing removed and in a fully unfolded state.
Figure 12:
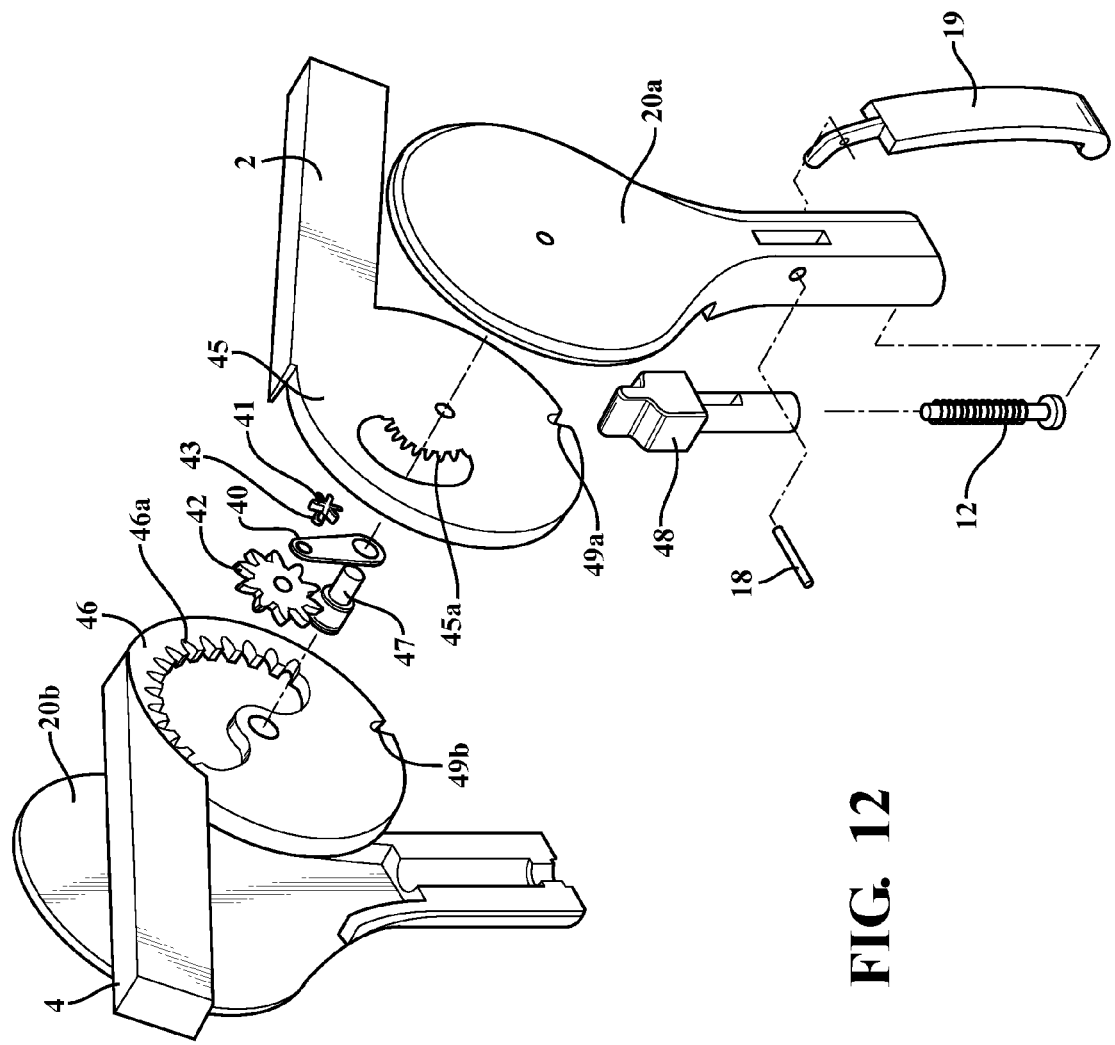
FIG. 12 is an exploded view corresponding to FIG. 11 of the folding mechanism.

The fourth embodiment is a folding mechanism 6c consisting of two outer casings 20a, 20b, two gear components 45, 46; two pinion gears 41, 42; and a locking mechanism 82 (See FIG. 11 and FIG. 12). The two gear components 45, 46 are placed in face-to-face juxtaposition. Each gear component has a set of gear teeth in a partial hollow cut from the surface. In FIG. 12, the series of gear teeth are along the bottom lip of the hollow cut 45a (radially inward gear) of the first gear component 45, while a second series of gear teeth are along the top lip of the hollow cut 46a (radially outward gear) of second gear component 46. The hollow cuts 45a, 46a can be part of the gear component itself (by stamping or molding), or can be part of an individual piece attached to each of the bars connected to front wheel support 2 and push handle support 4.

The pinion gears 41, 42 are positioned in the hollow cut on gear components 45, 46 for driving engagement of folding mechanism 6c. The gear teeth of first pinion gear 41 is positioned to engage with the gear teeth of the first gear component 45, while the gear teeth of second pinion gear 42 is positioned to engage with the gear teeth of the second gear component 46. Both pinion gears are coupled to rotate simultaneously about a common axis fixed by the pin 43 connected to an arm 40. The arm 40 is further connected to the bolt 47 at the center of the gear components to secure the common axis in place. Hence, if one of the gear components is rotated, the rotational force is transferred to the pinion gears to cause the other gear component to rotate. For example, when the push handle support 4 is rotated towards the rear wheel support 3, the front wheel support 2 is rotated simultaneously towards the rear wheel support 3, as well. The two pinion gears can be manufactured as a single unit, or by two separate units attached as one entity. Each gear component 45, 46 further consists of a gear locking slot 49a, 49b on the edge to engage with a stopper 48 connected to the locking mechanism 82. The locking mechanism 82 consists of a spring loaded piston 12 which is attached to the end of outer casings 20a, 29b. The end of the outer casings is further connected to a rear wheel support 3. A lever 19 is connected to the locking mechanism 82 via pin 18 for retracting the stopper 48.

To fold the stroller, the lever 19 is lifted up to retract the stopper 48. The stopper 48 detaches from the gear locking slots 49a, 49b and frees the two gear components 45, 46 to rotate. Since the gear components 45, 46 are further attached to front wheel support 2 and push handle support 4 respectively, the weight of both ends, due to gravity, will cause the stroller to fold slowly. The position of the lever 19 can be extended away from the locking mechanism 82 to be in closer proximity to the stroller user by using means such as cable wires on locking mechanism 82 and levers 19 to control the locking operation.

Figure 13:
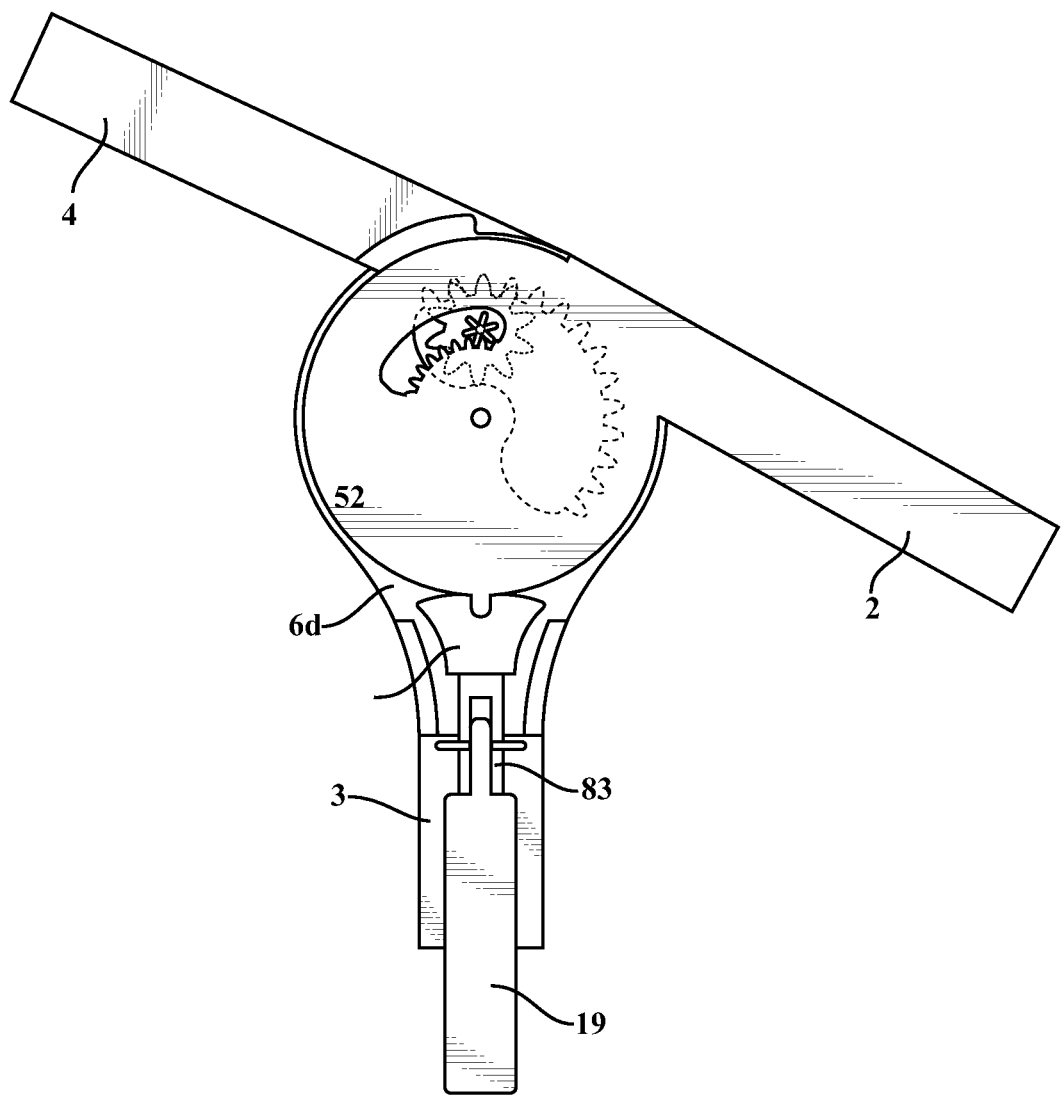
FIG. 13 is an enlarged fragmentary view of the folding mechanism according to the fifth embodiment of the present invention with its outer housing removed and in a fully unfolded state.
Figure 14:
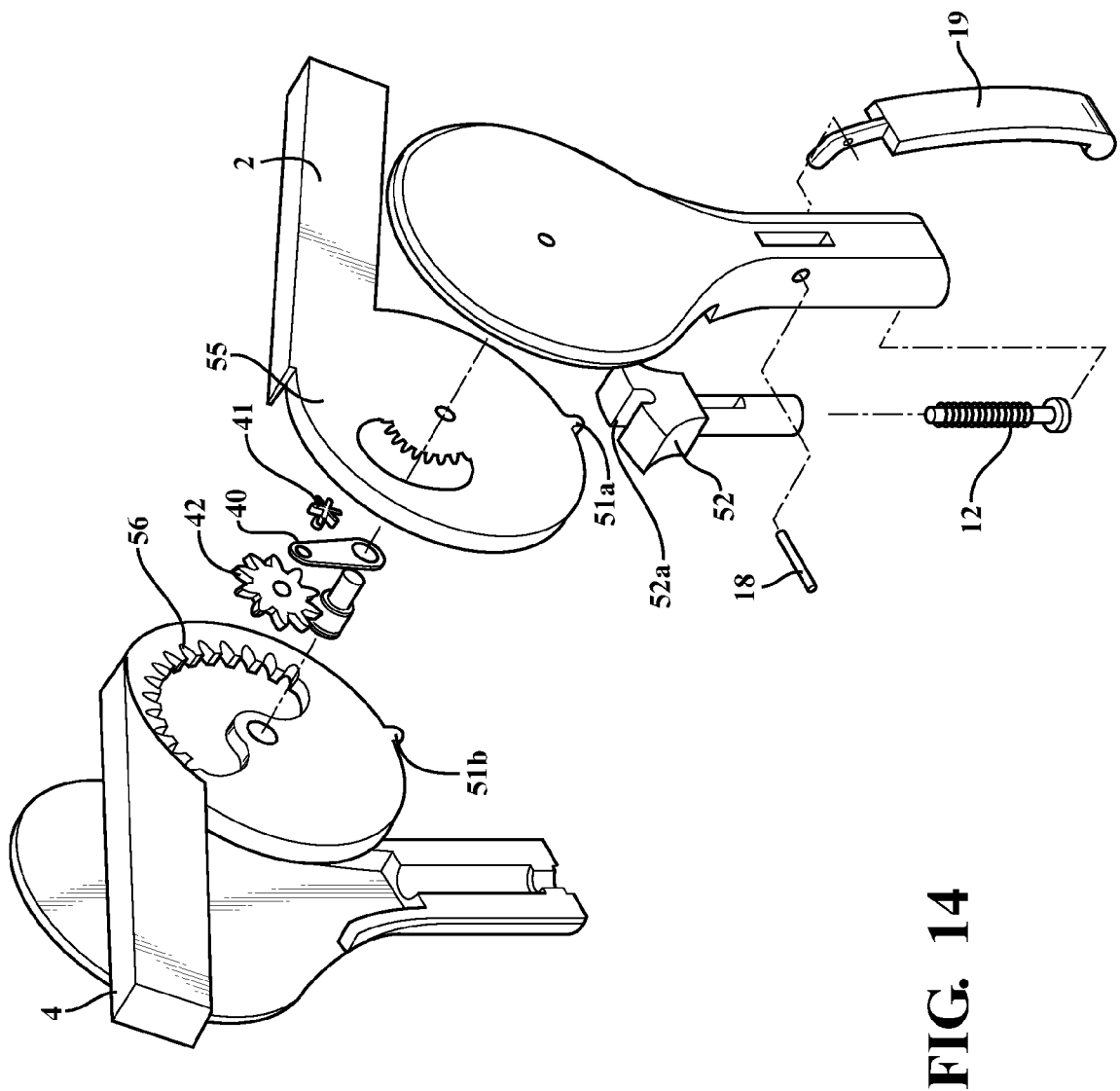
FIG. 14 is an exploded view corresponding to FIG. 13 of the folding mechanism.

It is worth mentioning that as an alternative embodiment of the locking mechanism 82, a receptor block 52 is connected to the locking mechanism 83 to engage with the protrusion tabs 51a, 51b at the gear component (See FIG. 14). The receptor block 52 has a hollow section, or it can be a hole or a slot to engage with the protrusion tabs 51a, 51b of the gear components. The folding mechanism 6d is able to operate in a similar fashion. This is depicted in FIG. 13 and FIG. 14.

To fold the stroller, the lever 19 is lifted up to retract the spring loaded receptor block 52. The receptor block 52 detaches from the protrusion tabs 51a, 51b and frees the two gear components 55, 56 to rotate. Since the gear components 55, 56 are further attached to the front wheel support 2 and push handle support 4 respectively, the weight of both ends, due to gravity, will cause the stroller to fold slowly.

When unfolding, the gear components 55, 56, rotate in the opposite direction with the edge of both gear components sliding along the surface of receptor block 52 as tension from the loaded spring keeps a light contact between the gear components and the receptor block 52. When the protrusion tabs 51a, 51b reach the tip of the receptor block 52, the tension released will cause the receptor block 52 to rise, thereby fitting the protrusion tabs 51a, 51b into the hollow slot 52a, halting the movement of the gear components 55, 56. The receptor block 52 and protrusion tabs 51a, 51b can be of any size and shape, as long as they are able to engage with each other.

Figure 15:
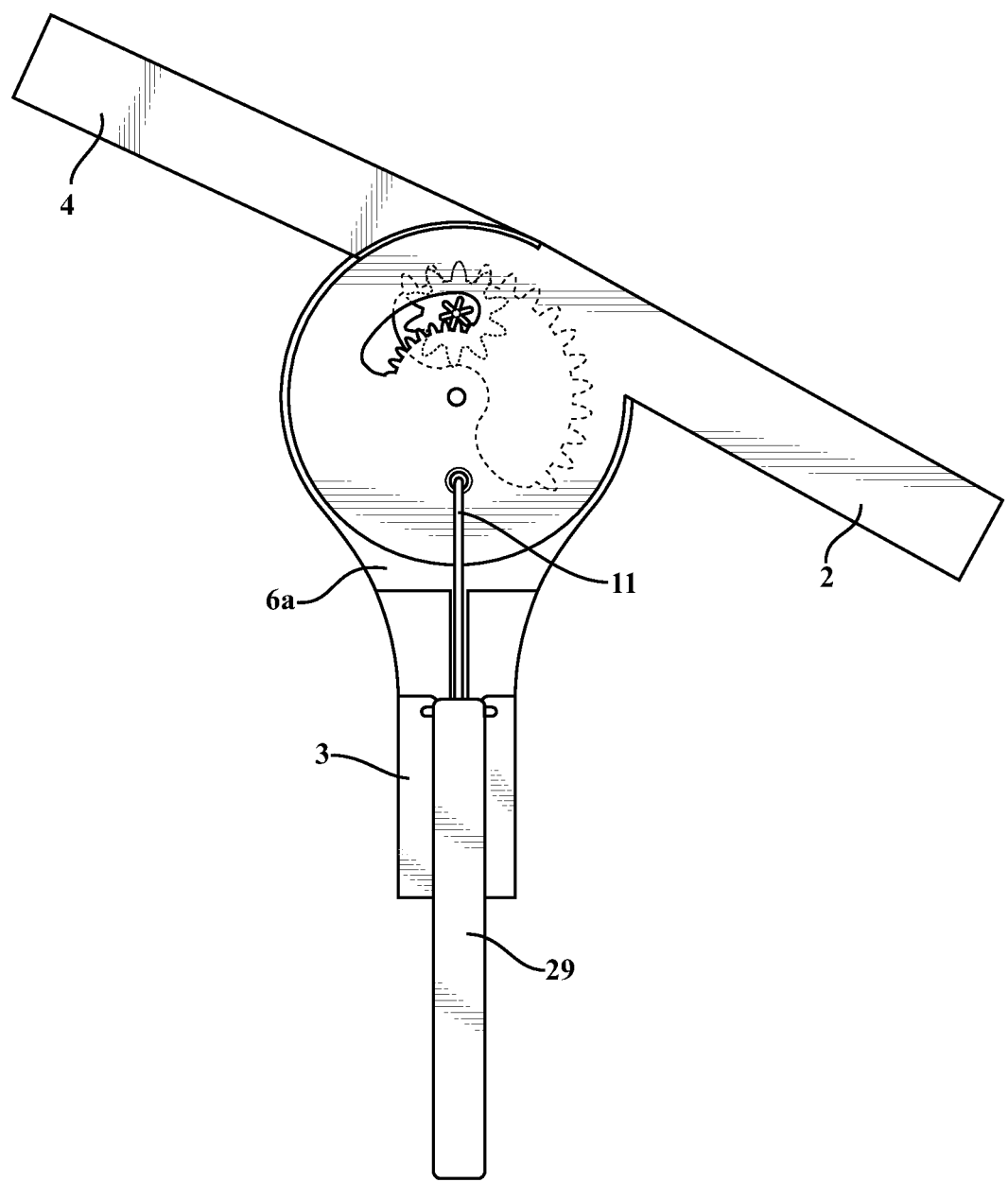
FIG. 15 is an enlarged fragmentary view of the folding mechanism according to the sixth embodiment of the present invention with its outer housing removed and in a fully unfolded state.
Figure 16:
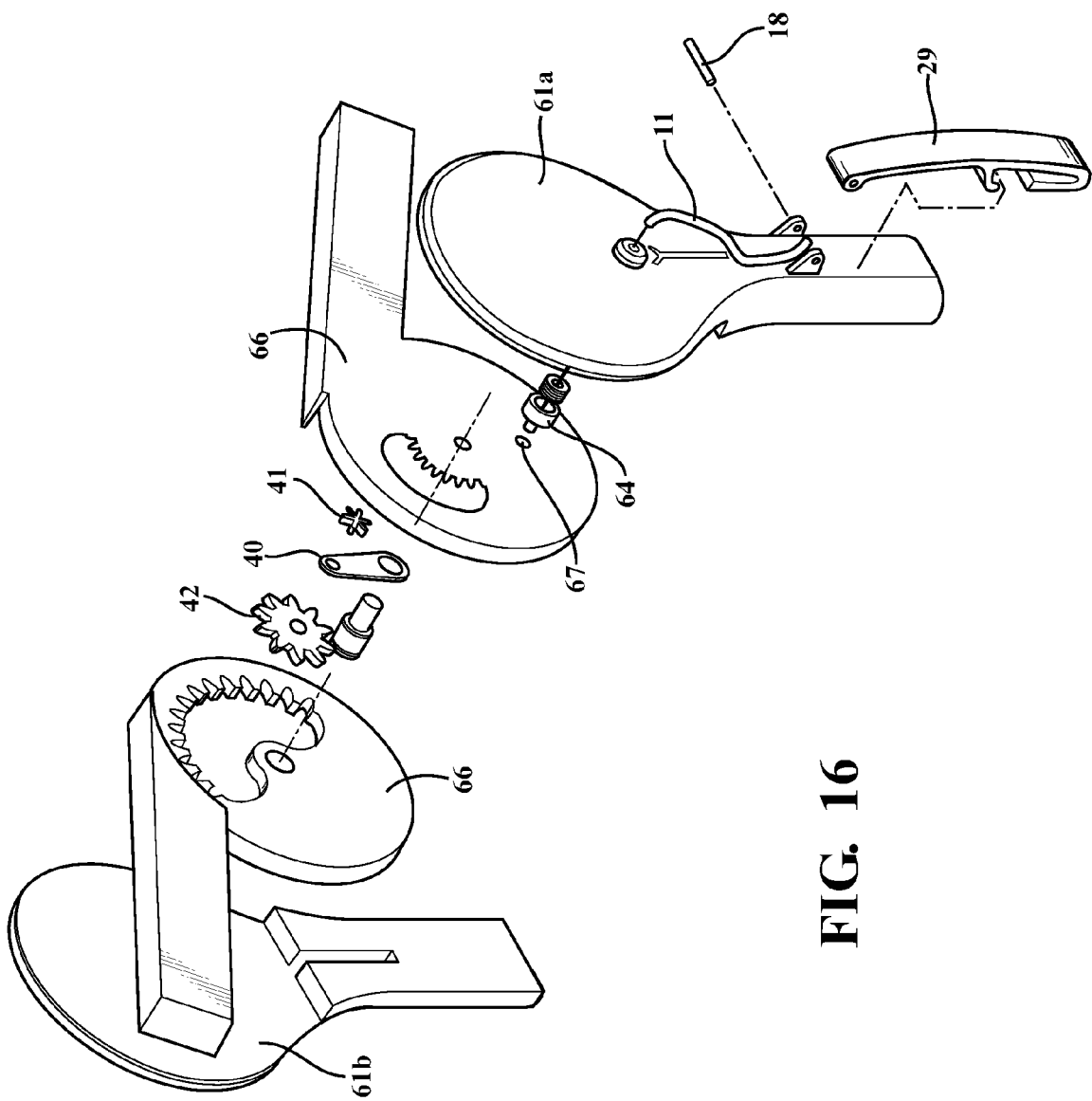
FIG. 16 is an exploded view corresponding to FIG. 15 of the folding mechanism.

In another embodiment of the folding mechanism 6e, there is a hole 67 on the gear surface of one or both of tire gear components 65, 66. This is depicted in FIG. 15 and FIG. 16. The hole 67 is positioned on the surface of gear component 65 adjacent to the outer casing 61a of the folding mechanism compartment 6e. A plug 64 is attached to the outer casing 61a. The movement of the plug 64 is guided by tension created with either cable tension, or spring loaded. The purpose of the plug 64 is to initiate and stop the movement of the gear component 65 since locking one gear component will prevent another gear component to move. To initiate the process of folding, as tension is applied from the cable, the plug 64 is pulled away from the hole 67 of the gear component 65, allowing initiation of movements of the gear components. With the guidance of the pinion gears 41, 42, all rotatable gears move in accordance with and as stated in a previous embodiment until the push handle support 4 and front wheel support 2 are parallel with each other. When the front wheel support 2 and push handle support 4 are in the process of being unfolded, the gear components 65, 66 move in accordance with the pinion gears 41, 42 in the folding mechanism in the opposite direction. The tensioned plug 64 slides along the surface of the gear component 65 until it drops into the hole 67 of the gear component 65 to halt the movement of the gears, thereby keeping the stroller in the fully unfolded position. The locking mechanism can also be achieved with a hole position on gear component 66 with tensioned plug engaging on gear component 66 to prevent another gear component from moving.

Figure 17:
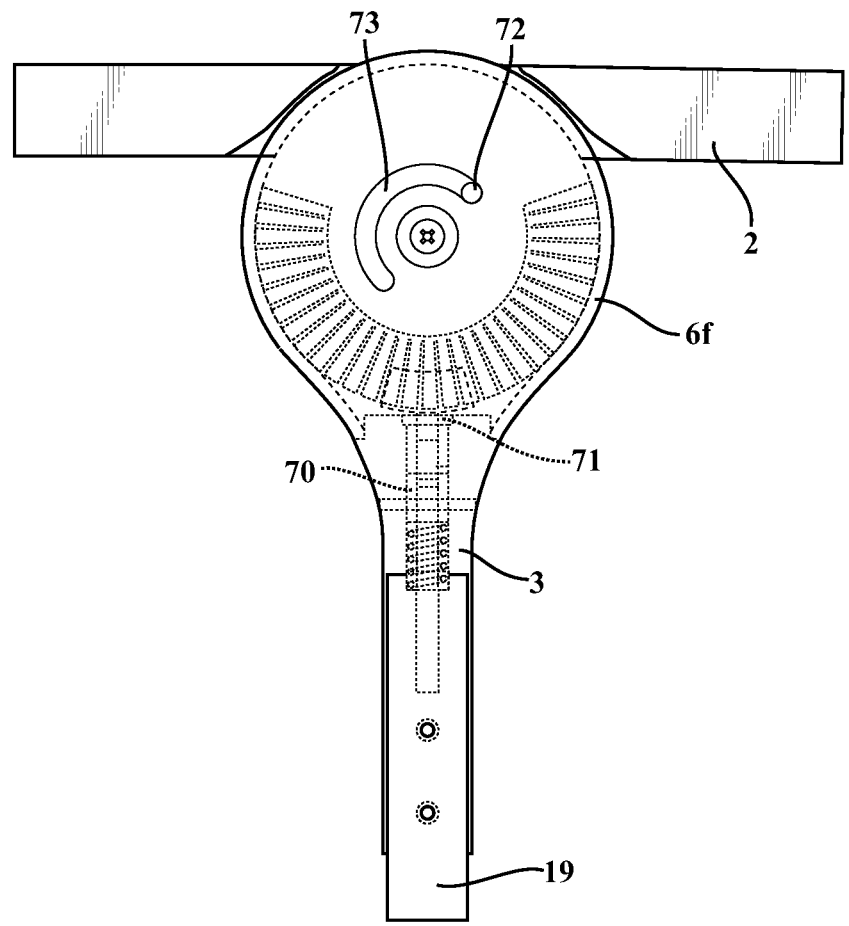
FIG. 17 is an enlarged fragmentary view of the folding mechanism according to the seventh embodiment of the present invention in a fully unfolded state.
Figure 18:
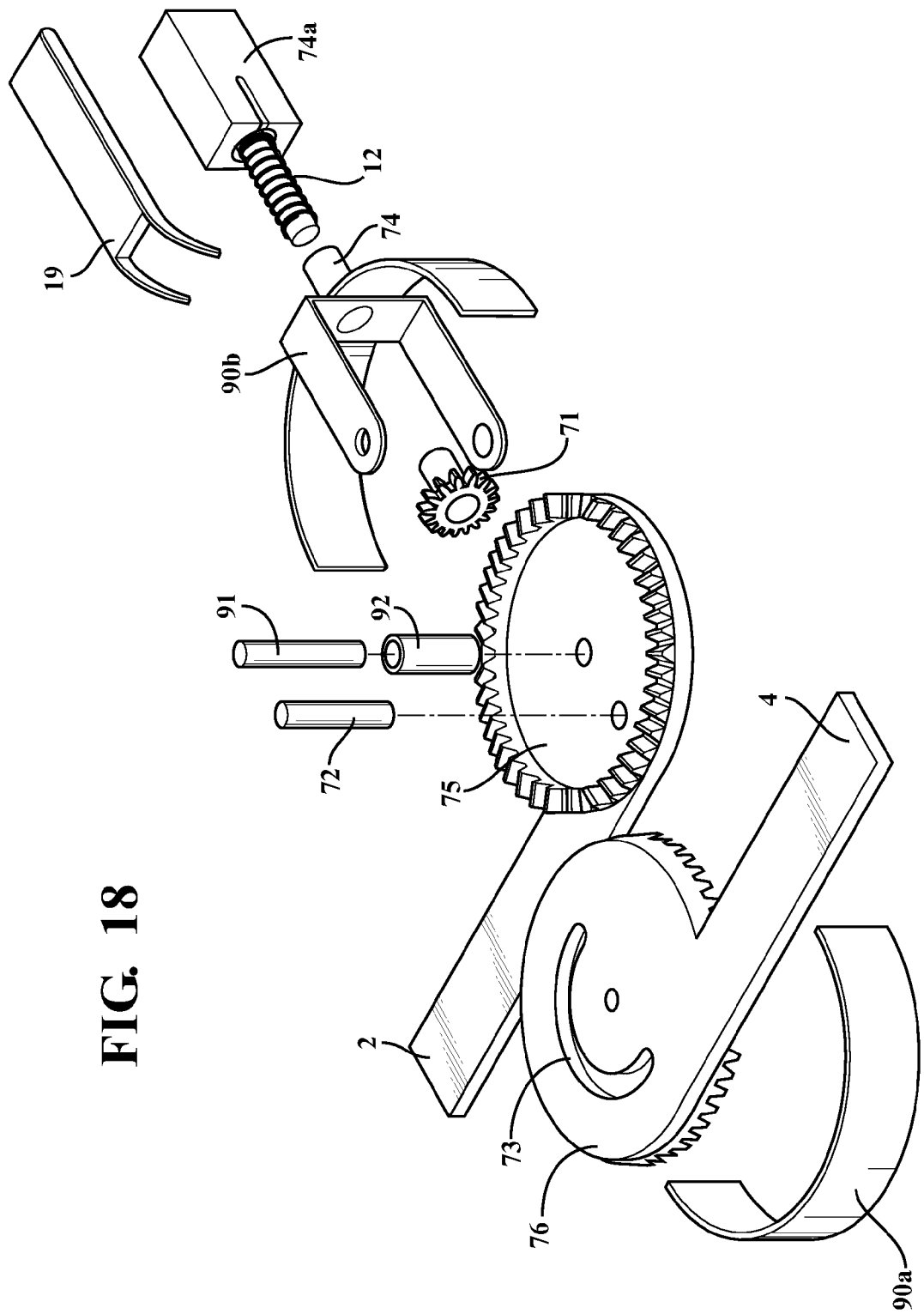
FIG. 18 is an exploded view corresponding to FIG. 17 of the folding mechanism.
Figure 19:
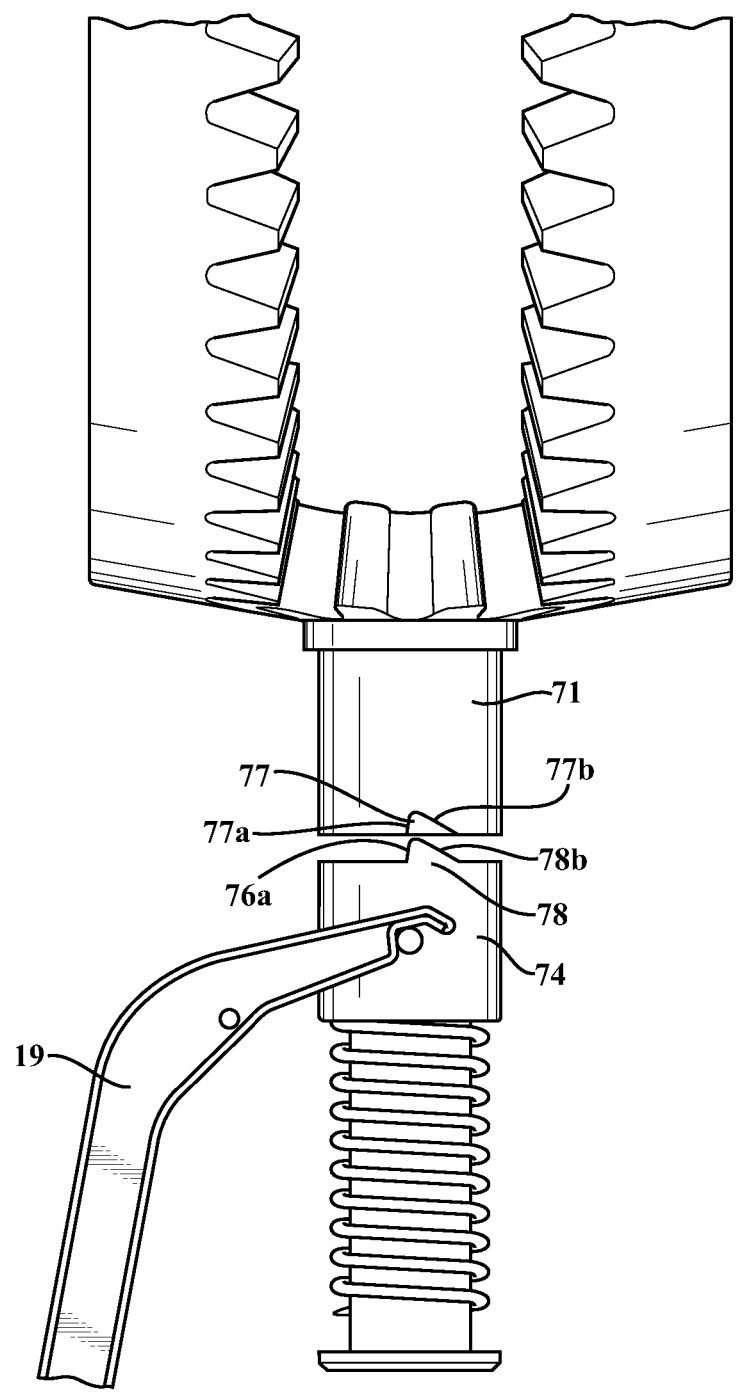
FIG. 19 is a side view, corresponding to FIG. 18 of the folding mechanism.

In another embodiment, the folding mechanism 6f now consists of two gear components 75, 76, a bevel gear controller 71, housing 90a, 90b and a locking mechanism 70 (See FIG. 17 and FIG. 18). The locking mechanism 70 consists of blocker support 74 and spring loaded piston 12 positioned inside the spring support holder 74a (See FIG. 18). The spring support holder 74a further connects to rear wheel supports 3 (not shown). The two gear components 75, 76 are placed in face-to-face juxtaposition. The bolt 91 is inserted to gear hub 92 to clamp the housing 90b of the folding mechanism to secure the two gear components 75, 76. The gear controller 71 can be of a bevel gear or any shape gear, as long as it achieves the same result. The gear component 75 further contains a stopping pin 72 fixed on its disk surface, while another gear component 76 consists of a stopping groove 73. As usual, the gear components 75 is connected to the front wheel support 2, and the gear component 76 is connected to the push handle support 4 of the stroller. The gear controller 71 initiates the simultaneous movement of the two gear components 75, 76, by rotating on a vertical axis. The gear controller 71 initiates the gliding of the stopping pin 72 along the stopping groove 73, as both gear components rotate simultaneously. In FIG. 19, the gear controller 71 further consists of a locking slit 77 (female connector) on its edge. The blocker support 74 has a protruded blocker 78 which acts as a male connector to lock the female connector of gear controller 71 when the spring is released. The locking slit 77 has a right-angle shaped apex 77a on one end, and a slope 77b on the other end. The protruded blocker 78 has right-angle shaped apex 78a on one end, and a slope 78b on the other end. The gear controller 71 is rotatable but the blocker support 74 is non-rotatable, and can only move vertically along with the spring.

When folding the stroller, the lever 19 is engaged to retract blocker support 74, thereby removing protruded blocker 78 from the locking slit 77, allowing the gear controller 71 to rotate. The stopping pin 72 guides the gear controller 71 to rotate in one direction until stopping pin 72 reaches the end of the stopping groove 73. Since the gear components 75, 76 are further attached to front wheel support 2 and push handle support 4 respectively, the weight of both ends, due to gravity, will cause the stroller to fold slowly. The stopping pin 72 glides in the direction from one end of the stopping groove 73 to the other end.

At the end of the folded position, the protruded blocker 78 rests on the surface of the gear controller 71 with tension from the loaded spring holding it in place.

When unfolding the stroller, the initial upward pulling of the push handle support 4 which is connected to gear component 76 will start the rotation of the gear controller 71 in a clockwise direction (from the top view). The rotation in the clockwise direction will continue with the locking slit 77 sliding out of the slope 78b of the protruded blocker 78 effortlessly, until the stopping pin 72 glides from one end of the stopping groove 73 to the other. At the end of the unfolding process, the stopping pin 72 will prevent the gear components from further unfolding. The locking slit 77 will rest in the protruded blocker 78 with right-angle shaped apex 78a of protruded blocker 78 engaging with the right-angle shaped apex 77a of the locking slit 77, thereby preventing the folding movement (counter-clockwise direction) of the gear components 75, 76. The combination of stopping groove 73, stopping pin 72, protruded, blocker 78 and locking slit 77 results in a locking mechanism on gear components 75, 76. The locking slit 77 and protruded blocker 78 can be of any size and shape, as long as they are able to engage with each other.

The invention claimed is:

1. A folding mechanism of a baby stroller comprising:
   (a) a pair of gear components, each gear component comprising at least one gear having a plurality of teeth along a majority of the outer circumference of the gear and being configured to protrude towards a central plane between the gear components, said gear components configured to couple together and rotate about a common axis of rotation, the first gear component connected to a front wheel support of the stroller; the second gear component connected to a push handle support of the stroller;
   (b) a gear controller, said gear controller having a plurality of teeth correspondingly configured to constrain the movement of said gear components; and
   (c) a locking mechanism, wherein said locking mechanism configured to constrain the movement of said gear controller.

2. The folding mechanism according to claim 1, wherein said locking mechanism further includes a blocker support configured to move along an axis and engage said gear controller.

3. The folding mechanism according to claim 1, wherein said locking mechanism further comprises at least one spring loaded piston positioned inside a spring support holder, said spring support holder being connected to a rear wheel support of the stroller.

4. The folding mechanism according to claim 1, the folding mechanism further including a stopping pin fixed to the first gear component and the second gear component further including a stopping groove, the stopping groove shaped to allow for the movement of the stopping pin through a specified range of rotation.

5. The folding mechanism according to claim 1, wherein said gear controller is a bevel gear controller.

6. The folding mechanism according, to claim 2, wherein said gear controller further comprises at least one locking slit, the at least one locking slit, the locking slit configured to engage with the blocker support and prevent the rotation of the gear controller.

7. The folding mechanism according to claim 6, wherein said at least one locking slit has a right-angle shaped apex on one end, and a slope on another end.

8. The folding mechanism according to claim 7, wherein said blocker support further comprises a protruded blocker, said protruded blocker further configured to engage the at least one locking slit of said gear controller when a spring is released.

9. The folding mechanism according to claim 8, wherein said protruded blocker has a right-angle shaped apex on one end, and a slope on another end, the right-angle apex of the at least one locking slit configured to engage with the right-angle apex of the protruded blocker and prevent the rotation of the gear components.

10. A folding mechanism of a baby stroller comprising:
    a pair of gear components, each gear component comprising at least one gear having a plurality of teeth along a majority of the outer circumference of the gear and being configured to protrude towards a central plane between the gear components, said gear components configured to rotate about a common axis of rotation, the first gear component connected to a front wheel support of the stroller; the second gear component connected to a push handle support of the stroller;
    a gear controller, said gear controller having a plurality of teeth correspondingly configured to constrain the movement of said gear components, the gear controller including at least one locking slit, the at least one locking slit configured to engage with a blocker support and prevent the rotation of the gear controller, said at least one locking slit having a right-angle shaped apex on one end, and a slope on another end, said right-angle shaped apex configured to constrain the movement of the gear controller when engaged.

* * * * *